Dec. 13, 1938. F. BEDELL Re. 20,945

DEVICE FOR INDICATING OSCILLOGRAPH CURVES AS STATIONARY

Original Filed May 7, 1927 2 Sheets-Sheet 1

INVENTOR
F. BEDELL
BY
Pennie, Davis, Marvin and Edmonds.
ATTORNEYS

DEVICE FOR INDICATING OSCILLOGRAPH CURVES AS STATIONARY

Original Filed May 7, 1927 2 Sheets-Sheet 2

Motor Driven Distributor

INVENTOR
F. BEDELL
BY
Pennie, Davis, Marvin and Edmonds.
ATTORNEYS

Reissued Dec. 13, 1938

Re. 20,945

UNITED STATES PATENT OFFICE 20,945

DEVICE FOR INDICATING OSCILLOGRAPH CURVES AS STATIONARY

Frederick Bedell, Ithaca, N. Y., assignor to General Radio Company, Cambridge, Mass., a corporation of Massachusetts Original No. 1,707,594, dated April 2, 1929, Serial No. 189,727, May 7, 1927. Application for reissue August 18, 1937, Serial No. 159,732

13 Claims. (Cl. 171—95)

My invention relates to improvements in devices for indicating oscillograph curves as stationary, and it consists in the combinations, constructions, and arrangements herein described and claimed.

Devices for showing oscillograph curves, such as produced by a cathode ray impinging on a fluorescent screen, have been used, whereby variations in electrical quantities such as voltages or currents may be observed. In such devices, however, the resulting curves or waves representing the varying quantities are apt to be confused.

An object of my invention is to provide a device, by means of which such curves are indicated as stationary, thereby increasing materially the utility of the device.

A further object is to provide an arrangement, by means of which several waves or half waves may be centered upon a fluorescent screen or plate, and in which distortion is avoided, so that the shape of the curve practically represents the variations from instant to instant of the quantities under observation.

A further object is to provide an arrangement for accomplishing the above-named objects in which a cathode-ray tube is made use of with a set of deflecting elements which has impressed upon it an electromotive force or current under observation and a second set of elements which has impressed upon it a current or electromotive force varying substantially in direct proportion to time, so that the resulting deflection of the cathode beam in one direction is proportional to the electrical quantity under observation, and the deflection in the other direction is proportional to time, giving a so-called "linear" time-axis.

A further object is to provide a polycyclic distributor, by means of which several currents or electromotive forces separately in rapid succession may be applied to the first set of deflecting elements, so that to the eye or photographic plate the several resulting curves, representing the several unknown quantities under observation, although produced separately, appear simultaneous and continuous.

A further object is to provide an assembly of control and supply devices, said control devices consisting of resistors and means for effecting their variations, so that one part of the circuit system may be adjusted without disturbance to some other part, and of means in association with said resistors, whereby residual fluctuations in the current supply are so compensated that disturbing variations in the intensity of the cathode beam are avoided.

Other objects and advantages will appear in the following specification, and the novel features of the invention will be particularly pointed out in the appended claims.

Figure 1:
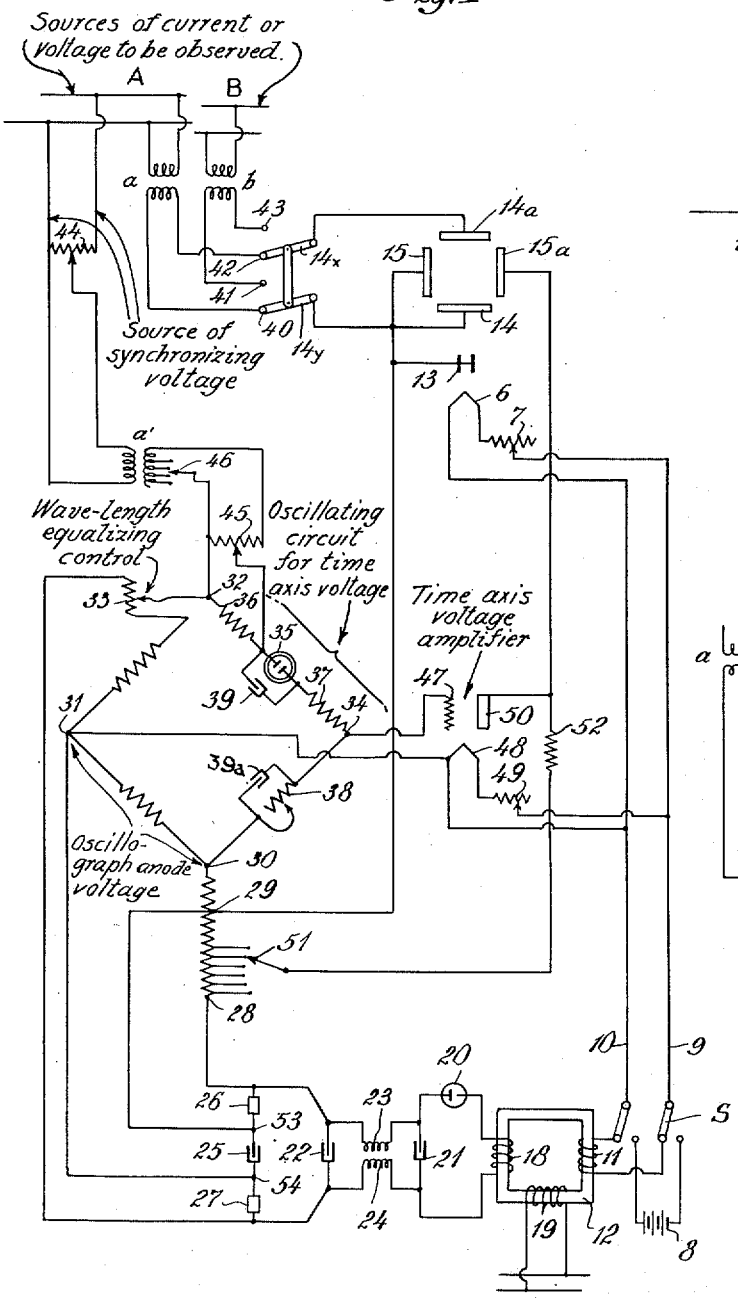
Figure 2:
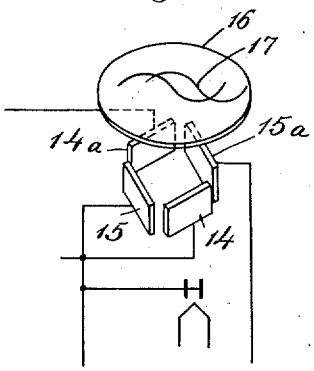
Figure 3:
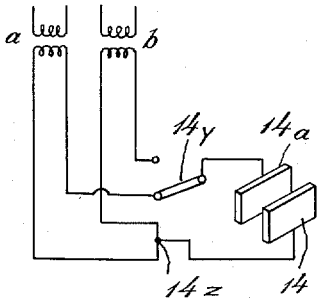
Figure 4:
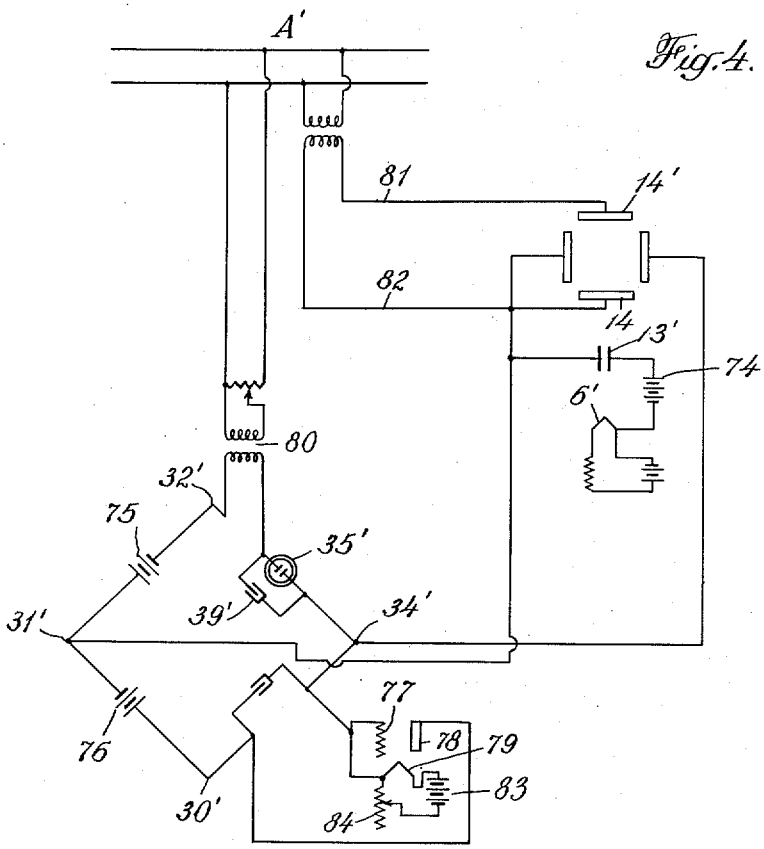
Figure 5:
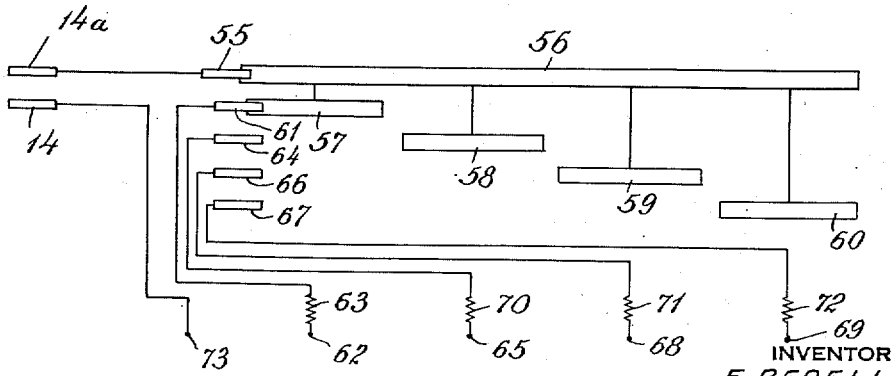

My invention is illustrated in the accompanying drawings, forming part of this application, in which Figure 1 is a diagrammatical view, showing the arrangement of the electrical circuits, of one form of the invention, Figure 2 is a view showing the relation of the screen to the deflector plates of Figure 1, Figure 3 is a modified form of a portion of the circuit, Fig. 4 is a diagrammatic view of a modified form of the device, and Figure 5 is a diagrammatic view showing the development of a polycyclic distributor.

Referring to Figure 1, I have indicated the cathode 6 of a cathode-ray oscillograph tube as a hot filament, heated by current controlled by the resistance 7, this current being either direct current derived from a battery 8 by means of the conductors 9 and 10 or by alternating current derived from the secondary winding 11 of the transformer 12 when the switch S is shifted to the position shown in Figure 1.

The anode is shown at 13 and is maintained at a definite positive potential (hereinafter referred to as the operating potential) with respect to the cathode 6 in a manner described later. This operating potential is less when the cathode is heated, as here shown, but it will be understood that my invention applies to any type of cathode-ray tube and is not limited to a tube employing a hot cathode. The two sets of deflecting elements are indicated at 14, 14*a* and 15, 15*a*, respectively. Associated with these elements either within or without the tube is a plate 16, such as a fluorescent screen, upon which curves 17 are to be observed. The relation of the plate 16 and the deflecting elements is shown in Figure 2.

One set of deflecting elements is connected to the electrical circuit or circuits upon which observation is to be made and the other set to a source of electromotive force varying substantially in direct proportion to time. The deflecting elements, as here shown, are plates, and it is commonly desirable in this case to connect one plate of each pair or set, as the plates 14 and 15, to the anode 13.

In Figure 1 I have shown the operating potential which is applied between the cathode 6 and the anode 13 as being derived from certain points on a resistor system to which a uni-directional current is flowing and from other points on the same system to derive the potential difference for operating the oscillating circuit for obtaining the linear time-axis, as described later. The uni-directional current through this resistor system, as shown in Figure 1, is derived by rectifying and filtering alternating current obtained from the secondary 18 of the transformer 12, the primary 19 of which is connected to a lighting or other source of alternating current. Connected with the secondary 18 of the transformer 12 is a suitable rectifying device 20. 21, 22 and 25 are condensers and 23 and 24, choke coils to filter or smooth out the current in the usual manner. The coils 23 and 24 possess mutual inductance for added stability. 26 and 27 are impedances, the condenser 25 being connected to these impedances across the lines leading from the choke coils 23 and 24, this arrangement constituting a compensating or ballast device, as described later.

From the terminals of the condenser 25, conductors lead to the points 29 and 31, respectively, these being the points from which the operating potential for the cathode tube is derived.

The resistor system is generally indicated by the apparatus disposed between the points 28, 29, 30, 31 and 32. The resistance 33 is an equalizing resistance for controlling the potential of the point 31 with respect to the point 34.

At 35 I have indicated diagrammatically a so-called discharge lamp, comprising two electrodes or terminals in a gas-tight vessel containing neon, argon or like gas. As is well known, such a gas-discharge lamp permits no current to flow unless the potential applied to its terminals equals or exceeds a certain so-called ignition voltage. Current will then continue to flow, even with a lower applied voltage, until the voltage falls to or below a certain so-called extinction voltage. In series with the gas-discharge lamp 35 are the resistances 36, 37 and 38. 39 is a condenser which may be used to increase the capacitance of the gas-discharge lamp 35, which itself acts like a condenser with a certain capacitance. In operation, when a potential derived from 32 and 30 is applied to the circuit 36, 35, 37 and 38, no current flows through the lamp until the difference of potential at its terminals has increased approximately in proportion to time, to the ignition voltage. Current then flows and the difference of potentials almost instantly falls until the extinction voltage is reached. Current then stops flowing, the potential then again rises and the cyclic process is repeated.

Referring to the upper portion of Figure 1, I have shown two sources of current or potential, which I have indicated in general at A and B. These sources of current are connected through transformers *a* and *b* to the terminals 40, 42 and 41, 43, respectively. The source A is also connected by a transformer *a'* with the terminals of the resistance 36, variable resistances 44 and 45 being interposed, as shown. The secondary of the transformer *a'* may have taps 46. In Figure 1 I have shown the potential difference between the points 31 and 34 before being applied to the deflecting elements as being amplified. To this end, the grid 47 is connected with the point 34 and the filament 48 receives its current from the conductors 9 and 10 through a resistance 49. Plate voltage is supplied to the plate 50 by an adjustable connection at 51 with the resistor system. In the plate circuit is a resistor 52. When the point 31 is at the proper fixed potential, determined by the values of the several parts of the resistor system and controlled by the operator by means of the equalizing resistance 33, as described later, the fall of potential of the plate current through the resistor 52 is proportional to the difference of potential beween the points 31 and 34 and may be applied directly to the pair of deflecting plates 15 and 15ᵃ. One terminal of the resistor 52 is connected to the plate 15ᵃ, while the other terminal is connected to the point 51, which is adjustable, as stated.

The resistor system 28, 29, 30, 31 and 32 supplies from two points, as 29 and 31, the operating potential for the cathode tube, as already explained. It also supplies from two points, as 32 and 30, potential for the oscillating circuit 32, 34, 30, which, through synchronous oscillations in the potential of the point 34, makes it possible to apply to the deflecting elements 15 and 15ᵃ a potential difference varying substantially in direct proportion to time. Not only is there applied to the plates 15 and 15ᵃ the fall of potential through 52, varying approximately with time, but also the constant supplemental fall of potential through a controllable part of the resistor, so that the cathode beam may, by varying the amount of this supplemental difference of potential, be centered or decentered at will, thereby making possible the use of the same resistor system for supplying the operating potential for the cathode tube as supplies the potential for the oscillating circuit for obtaining the linear time-axis.

The frequency with which the gas-discharge lamp charges and discharges may be controlled by the variable resistance 38 in series therewith, or by changing the capacitance of the condensers 39 and 39ᵃ in parallel, respectively, with the lamp 35 and the variable resistance 38. This frequency may thus be made approximately equal to the frequency of some periodically varying quantity under observation, or to bear some rational ratio (i. e., a ratio of two whole numbers) thereto. It is necessary, however, to make this relation precise, in order that the wave or figure shown by the variation of the cathode beam stands stationary for observation, in other words, to stabilize the linear time-axis. A feature of my invention is the means for accomplishing this and for bringing the discharge of the gas tube in precise synchronism with a periodic quantity under observation. I have found that when the discharge of the gas-discharge tube is not precisely synchronous it may be stabilized and brought into precise synchronism by introducing into the oscillating circuit a very small electromotive force derived from the same source as the periodic quantity under observation. I have found, however, that the introduction of this electromotive force will produce distortion in the resulting wave shown by the oscillograph, unless introduced in such a manner as not to be applied directly or indirectly, either in part or in whole, to the circuit leading to the deflecting plates of the oscillograph.

The means for effecting this stabilization without distortion are shown in Figure 1. The primary of the transformer *a'* is supplied with periodically varying current from the source A that supplies the circuit under observation through the transformer *a*. The secondary circuit of the transformer *a'* is connected, as stated, to the terminals of the resistance 36 in series with the gas-discharge lamp 35.

In operation, when the potential of the gas-discharge lamp 35 has increased to nearly the ignition voltage, a tiny impulse from the transformer applied to the terminals of the resistance 36 is sufficient to cause it to discharge synchronously with the source leading to the transformers *a* and *a'*. I have found that a very minute amount of energy, thus applied, brings absolute synchronism.

Even a small amount of energy, however, if allowed to affect the deflecting plates of the oscillograph, would cause objectionable distortion in the resulting wave. By introducing voltage in the manner shown in Figure 1, I have been able to obviate such distortion, making use, for this purpose, of the properties of the gas-discharge lamp itself; for, while the gas-discharge lamp is charging, it allows no current to flow; stabilizing current flows through the resistance 36 only and none of it gets through the gas-discharge lamp 35 so as to affect the oscillograph. Should any stabilizing current get through during the instant that the gas-discharge lamp discharges, it would be immaterial and produce no distortion, for the wave-form under observation is produced while the gas-discharge lamp 35 is charging. The degree of stabilization may be controlled by the resistances 45 or 44 or by the taps on the transformer *a'*. The oscillating circuit is inductively coupled with the source A, the transformer *a'* serving as an insulating transformer for this purpose.

In connection with Figure 1, I have previously explained that I employ a filter system for supplying unidirectional current through a resistor system for supplying both the oscillating circuit and the operating potential of the tube. I find that in order to render these two functions independent, it is desirable to employ a compensating or ballast device to maintain uniform difference of potential between the points 31 and 34 and to eliminate so far as possible the effect of any residual fluctuations in the operation of the tube. For this purpose, the condenser 25 is connected, through the impedances 26 and 27, across the lines leading from the chokes 23 and 24 to the points 28 and 32, respectively. From the points 53 and 54, the terminals of the condenser 25, balancing connections, as shown, are led to the points 29 and 31 from which the operating potential for the cathode tube is derived, as already stated.

In Figure 1, a small fractional end part of the resistance between 31 and 32 is brought out to a variable resistor 33 under the control of the operator. By this device I am able to equalize the wave-lengths of a curve comprising several wave-lengths, as shown by the oscillograph and to avoid distortion. Without such a convenient equalizing device, I have found that due to improper bias on the amplifier tube, distortion resulted, as shown by lack of equality in succeeding half-waves displayed by the oscillograph. The equalizing resistance 33, by controlling the potential of the point 31 with respect to the point 34, makes it possible to apply the proper biasing voltage to the grid 47 with respect to the filament 48. This enables the operator to control this bias and to eliminate distortion, so that successive waves are equal, as is necessary for correct observation.

When only a single quantity is under observation, as for example an electromotive force connected to the source A through the transformer *a*, the terminals of the secondary of the transformer may be connected continuously to the deflecting plates 14 and 14*a*, respectively. The stabilizing circuit derives current, through the transformer *a'*, as already explained, either directly or indirectly from the same source of periodic current.

When two quantities are to be simultaneously observed, for example, an electromotive force from the source A and from the source B, these are successively applied to the deflecting plates by means of a rapidly moving polycyclic distributor, diagrammatically shown in Figure 5. In this figure, which, as has been stated, shows the development of one form of polycyclic distributor which I have used, I have indicated at 55 a brush which is connected to one of the deflecting plates, such as the plate 14ª in Figure 1 and bears on a continuous motor-driven slip-ring 56, to which are connected staggered quadrants 57, 58, 59 and 60, respectively. A brush 61 bears on the quadrant 57 and is connected to the terminal 62 through a suitable resistance 63. A brush 64, bearing on the quadrant 58, is connected to the terminal 65, and the brushes 66 and 67, which bear on the respective quadrants 59 and 60 are connected respectively to the terminals 68 and 69 each of the brushes being in series with a resistance similar to 63, these resistances being shown at 70, 71 and 72, respectively. The opposite terminal of each of the several circuits which is shown at 73 is connected to the deflecting plate 14. By this arrangement, the simultaneous observation of a number of varying quantities may be made, since, through the medium of the distributor, several currents or electromotive forces are applied to the deflecting elements separately in rapid succession.

A direct connection, as, for instance, from the terminal 62 to the terminal 73, give zero difference of potential between the deflecting plates 14 and 14ª and hence produces a zero line on the screen.

The distributor is driven, preferably, by a non-synchronous motor, so that successive interruptions in the record of one wave do not occur at the same point in the cycle. It is understood that the distributor is driven at such a speed that, due to persistence of vision, the several waves produced on the screen separately in rapid succession, appear to be simultaneous and continuous.

Whereas it is preferable to use the resistor system as explained in connection with the embodiment of my invention, as shown in Figure 1, that part of my invention that relates to the electrical stabilization of the linear time-axis for a cathode-ray oscillograph may be applied independent of such resistor system. Such an application is shown in Figure 4. Here an independent battery 74, connected to the anode 13' and the cathode 6', is employed to supply the operating potential for the cathode-ray oscillograph tube. Batteries 75 and 76 are interposed between the points 32' and 31' corresponding to the points 32 and 31 in Figure 1 and between 31' and 30', corresponding to the points 31 and 30 in Figure 1 to supply the proper electromotive force for the oscillating circuit 32', 34' and 30', the relative values of 75 and 76 being such that the point 31' is maintained at the proper potential.

In the application of my invention shown in Figure 4, no amplifier is used, the function performed by such amplifier being useful, although not essential. In Figure 4 I have shown as substituted for the resistance 38 a thermionic rectifying tube, with a grid 77, plate 78 and filament 79, heated by current from battery 83, controlled by a resistor 84. When such thermionic tube is operated above saturation, a constant current passes through the tube, charging the gas-discharge lamp 35′ and the condenser 39′ at a constant rate and causing the potential between the terminals of the gas-discharge lamp to increase in proportion to time and thus to give the desired linear time-axis. In order to precisely synchronize the successive charge and discharge of the gas-discharge lamp 35′ and so to stabilize the linear time-axis in the manner described in connection with Figure 1, I introduce into the oscillating circuit in which the gas-discharge lamp is located, through the insulating transformer 80, a small electromotive force connected directly or indirectly with the source A′ that supplies the circuit 81—82 under observation.

In Figure 1, I have shown the plates 14 and $14^a$ as each being connected to a movable distributor member, such as those shown at $14^x$ and $14^y$. This, it will be understood, is a diagrammatic showing to indicate that the operation may be carried on by shifting the connections of both plates. In Figure 3, I have indicated an arrangement in which the connection from the plate $14^a$ is shifted at $14^y$, the other plate being connected at all times at $14^z$ to the opposite terminals of the circuits under observation. An elaboration of this arrangement has already been described in connection with Figure 5.

I claim:

1. In a device of the type described, a cathode-ray tube, a plurality of sources of electromotive force, means for causing the projection of a cathode beam, a plate for receiving the beam, means for deflecting the beam in one direction to extents proportional to the several electromotive forces, periodically and in rapid succession, means to deflect the beam in another direction fixed with respect to the first direction to an extent proportional to the time, whereby curves comprising several wave lengths are indicated on the plate, and means for equalizing the wave lengths of each curve, thereby preventing distortion.

2. In a device of the type described, a cathode-ray tube, a plurality of sources of electromotive force, means for causing the projection of a cathode beam, a plate for receiving the beam, means for deflecting the beam in one direction to extents proportional to the several electromotive forces, periodically and in rapid succession, means to deflect the beam in another direction to an extent proportional to the time, whereby curves comprising several wave lengths are indicated on the plate, means for equalizing the wave lengths of each curve, thereby preventing distortion, and means for centering the curves upon the plate.

3. In a device of the type described, a cathode-ray tube, a plurality of sources of electromotive force, means for causing the projection of a cathode beam, a plate for receiving the beam, a plurality of sets of deflecting elements associated with the tube, means including a distributor for connecting each of said several sources of electromotive force with one of said sets of deflecting elements periodically and in rapid succession, and means for impressing an electromotive force upon another of said sets of deflecting elements.

4. In a device of the type described, a cathode-ray tube, means for projecting a cathode beam, a source of electromotive force, means for deflecting the cathode beam in one direction, means for deflecting the beam in another direction, a resistor circuit, means for causing a unidirectional current to flow through said resistor circuit, an oscillating circuit connected with said resistor circuit and having a gas-discharge lamp therein, and means for synchronizing the discharge of said gas-discharge lamp with said source of electromotive force.

5. In a device of the type described, a cathode-ray tube, two sets of deflecting elements associated therewith, an image-receiving member, a plurality of sources of electromotive force, means for causing the projection of a cathode beam, means for impressing upon one set of said deflecting elements electromotive forces from said sources periodically and in rapid succession, whereby the beam is successively deflected in one direction to extents proportional to the several electromotive forces, means for impressing upon the other set of deflecting elements an electromotive force to deflect the beam in another direction fixed with respect to the first direction to an extent proportional to the time, and means for indicating on the image-receiving member the resulting curves.

6. Apparatus for producing stationary luminous wave-form traces of a periodic electrical quantity on the screen of a cathode-ray oscillograph by deflection of a focused cathode beam, comprising an oscillation generator having the characteristic that it falls into synchronous relation at a rational ratio with a periodic voltage introduced into a circuit of said oscillation generator, means including said oscillation generator for periodically deflecting said cathode beam in one direction in proportion to time, at a frequency which is determined by the frequency of said oscillation generator, means for deflecting said beam in another direction in proportion to said periodic quantity, and a coupling between said oscillation generator and the source of said periodic quantity for introducing into said circuit of said oscillation generator a periodic voltage derived from the source of said periodic quantity to lock the frequency of said oscillation generator in synchronous relation at a rational ratio with the frequency of said periodic quantity, whereby the traces formed by said deflected cathode beam appear stationary.

7. In apparatus for producing stationary luminous wave-form traces of a periodic electrical quantity on the screen of a cathode-ray oscillograph by deflection of a focused cathode beam, the combination of means including a gas-discharge tube oscillation generator adapted to generate a voltage of saw-tooth wave-form for periodically deflecting said beam in one direction at a frequency which is determined by the frequency of said oscillation generator, means for deflecting said beam in another direction in proportion to said periodic quantity, and means for introducing into a circuit of said oscillation generator in series with the discharge path of said gas-discharge tube a periodic voltage derived from the source of said periodic quantity to synchronize said oscillation generator precisely at a frequency which bears a rational ratio to the frequency of said periodic quantity, whereby the traces formed by said deflected cathode beam appear stationary.

8. In apparatus for producing stationary luminous wave-form traces of a periodic electrical quantity on the screen of a cathode-ray oscillograph by deflection of a focused cathode beam, the combination of an oscillation generator which tends to oscillate by itself at a frequency which bears approximately a rational ratio to the frequency of said periodic quantity and having the characteristic that it readily falls into synchronous relation with a small periodic voltage introduced into a circuit of said oscillation generator, the frequency of which voltage bears approximately a rational ratio to the frequency at which said oscillation generator tends to oscillate by itself, means including said oscillation generator for periodicaly deflecting said cathode beam in one direction in proportion to time, at a frequency which is determined by the frequency of said oscillation generator, means for deflecting said beam in another direction in proportion to said periodic quantity, and means for introducing into said circuit of said oscillation generator a small periodic voltage derived from the source of said periodic quantity to synchronize said oscillation generator precisely at a frequency which bears a rational ratio to the frequency of said periodic quantity, whereby the traces formed by said deflected cathode beam appear stationary.

9. Apparatus for producing a plurality of stationary luminous traces on the screen of a cathode-ray oscillograph having horizontal and vertical deflecting elements for deflecting a focused cathode beam, said luminous traces being representations respectively, of the wave-forms of several periodic electrical quantities rationally related in frequency, which comprises in combination an oscillation generator having the characteristic that it falls into synchronous relation with a periodic voltage introduced into a circuit of said oscillation generator, means for impressing a voltage derived from said oscillation generator on said horizontal deflecting elements, a distributor for impressing voltages of said periodic quantities singly and in rapid succession on said vertical deflecting elements, and means for introducing into said circuit of said oscillation generator a periodic voltage derived from the source of one of said periodic quantities to synchronize said oscillation generator precisely at a frequency which bears a rational ratio to the frequency of said last named periodic quantity, whereby the traces formed by said deflected cathode beam appear stationary.

10. In apparatus for producing stationary luminous wave-form traces of a periodic electrical quantity on the screen of a cathode-ray oscillograph by deflection of a focused cathode beam, the combination of an oscillation generator having the characteristic that it falls into synchronous relation with a periodic voltage introduced into a circuit of said oscillation generator, manual means for adjusting said oscillation generator to a frequency which bears approximately a rational ratio to the frequency of said periodic quantity, means including said oscillation generator for periodically deflecting said cathode beam in one direction at a frequency which is determined by the frequency of said oscillation generator, means for deflecting said beam in another direction in proportion to said periodic quantity, and means for introducing into said circuit of said oscillation generator a periodic voltage derived from the source of said periodic quantity to synchronize said oscillation generator precisely at a frequency which bears a rational ratio to the frequency of said periodic quantity, whereby the traces formed by said deflected cathode beam appear stationary.

11. In apparatus for producing stationary luminous wave-form traces of a periodic electrical quantity on the screen of a cathode-ray oscillograph by deflection of a focused cathode beam, the combination of an oscillation generator having the characteristic that it readily falls into synchronous relation with a small periodic voltage introduced into a circuit of said oscillation generator, the frequency of which voltage bears approximately a rational ratio to the frequency at which said oscillation generator tends to oscillate by itself, manual means for adjusting said oscillation generator to a frequency which bears approximately a rational ratio to the frequency of said periodic quantity, means including said oscillation generator for periodically deflecting said cathode beam in one direction at a frequency which is determined by the frequency of said oscillation generator, means for deflecting said beam in another direction in proportion to said periodic quantity, means for deriving from the source of said periodic quantity a small periodic voltage, manual means for adjusting the magnitude of said small periodic voltage and means for introducing the adjusted periodic voltage into the said circuit of said oscillation generator to synchronize said oscillation generator precise y at a frequency which bears a rational ratio to the frequency of said periodic quantity, whereby the traces formed by said deflected cathode beam appear stationary.

12. In apparatus for producing stationary luminous wave-form traces of a periodic electrical quantity on the screen of a cathode-ray oscillograph by deflection of a focused cathode beam, the combination of an oscillation-generator circuit including a source of direct-current, a resistance, a capacity and a gas-discharge tube, said circuit constituting an oscillation generator adapted to generate a voltage of saw-tooth waveform, means for producing horizontal deflection of said beam at a frequency which is determined by the frequency of said oscillation-generator, means for producting vertical deflection of said said beam in proportion to said periodic quantity, and means for introducing into a circuit of said oscillation-generator in series with the discharge path of said gas-discharge tube a small periodic voltage derived from the source of said periodic quantity to lock the frequency of said oscillation generator in synchronous relation with the frequency of said periodic quantity, whereby the traces formed by said deflected cathode beam appear stationary.

13. Apparatus for producing stationary luminous wave-form traces of a periodic electrical quantity on the screen of a cathode-ray oscillograph by deflection of a focused cathode beam, comprising a gas-discharge device, means including a source of direct current, a resistance and a condenser for causing periodic discharges of said gas-discharge device, means for deflecting said cathode beam in one direction at a frequency determined by said discharges, means for deflecting said beam in another direction in proportion to said periodic quantity, and means for applying a voltage derived from said quantity to said gas-discharge device, whereby the frequency of said discharges is caused to bear a rational ratio to the frequency of said quantity, and the traces formed by said deflected cathode beam appear stationary.

FREDERICK BEDELL.

DISCLAIMER

Re. 20,945.—*Frederick Bedell*, Ithaca, N. Y. DEVICE FOR INDICATING OSCILLOGRAPH CURVES AS STATIONARY. Patent dated December 13, 1938. Disclaimer filed November 20, 1939, by the assignee, *General Radio Company*.

Hereby enters this disclaimer to claims 1, 2, 3, and 5 in said specification.

[*Official Gazette December 12, 1939*.]